A. W. VOEDISCH.
ELECTRIC TIME SWITCH.
APPLICATION FILED JUNE 1, 1914.
1,143,869.
Patented June 22, 1915.
3 SHEETS—SHEET 1.
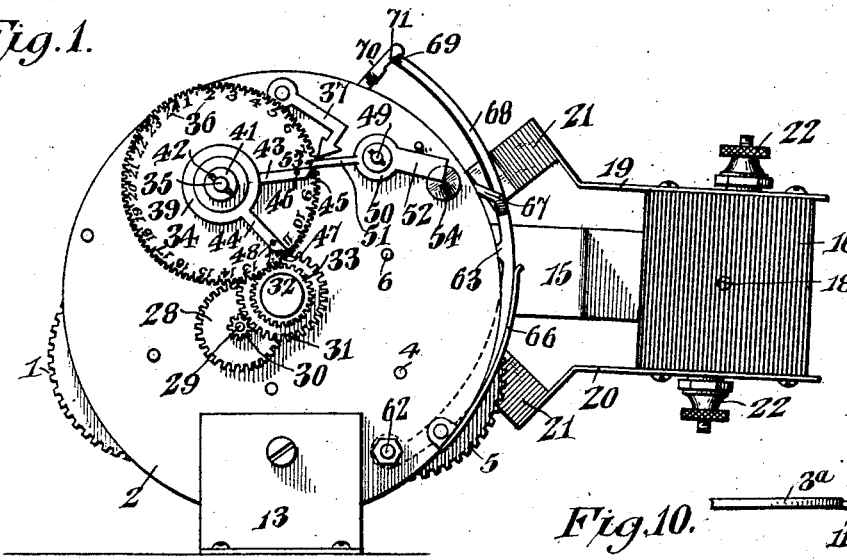
Fig. 1.
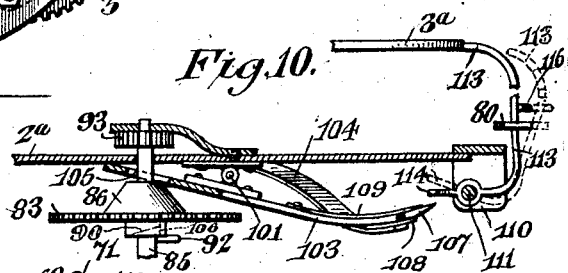
Fig. 2.
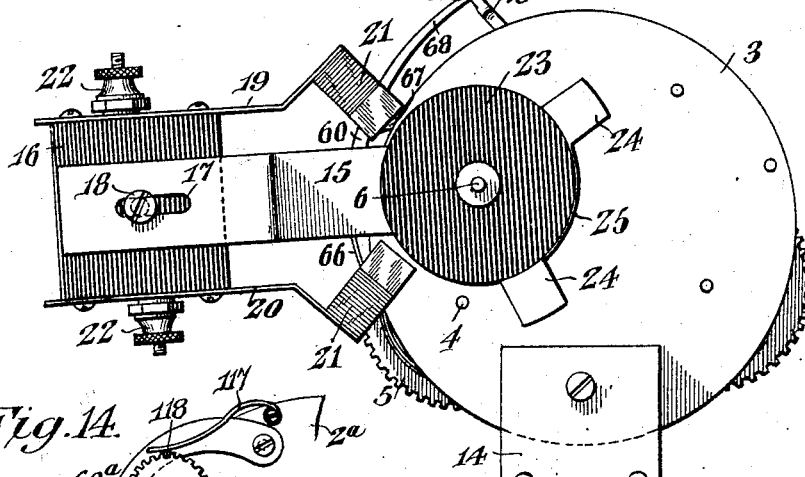
WITNESSES
A. W. Voedisch, INVENTOR
BY
ATTORNEY A. W. VOEDISCH.
ELECTRIC TIME SWITCH.
APPLICATION FILED JUNE 1, 1914.
1,143,869.
Patented June 22, 1915.
3 SHEETS—SHEET 2.
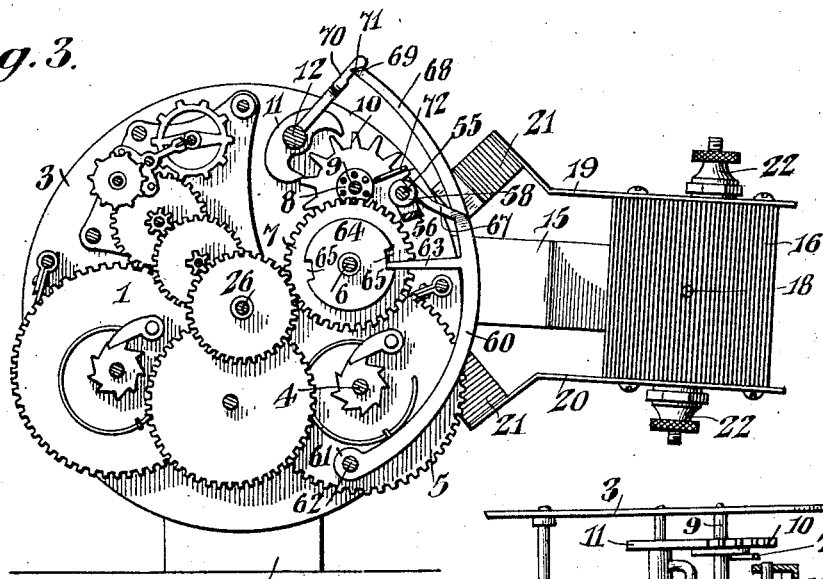
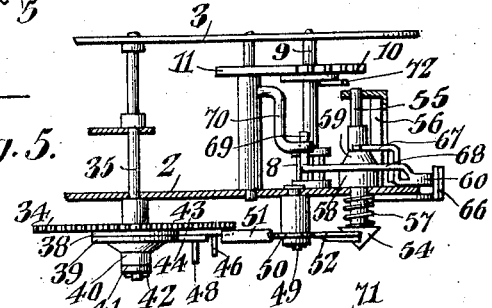
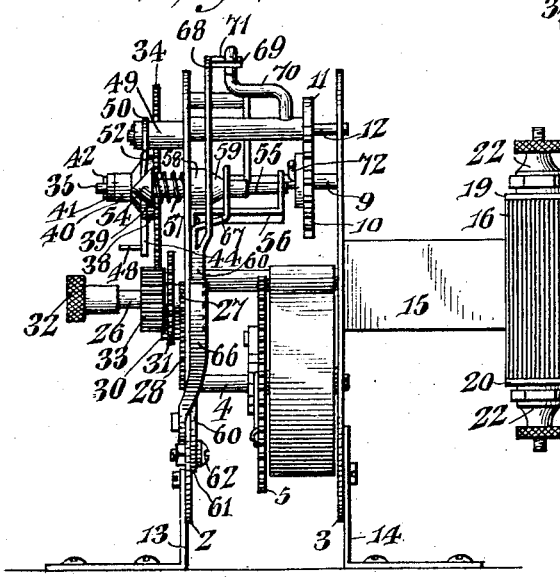
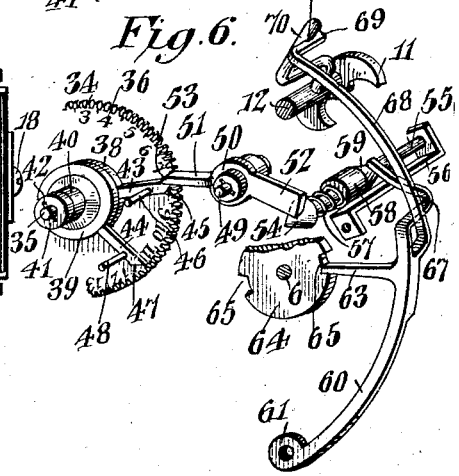
WITNESSES
Jas. K. McCathran
F. T. Chapman.
A. W. Voedisch, INVENTOR
BY E. G. Siggers
ATTORNEY A. W. VOEDISCH.
ELECTRIC TIME SWITCH.
APPLICATION FILED JUNE 1, 1914.
1,143,869.
Patented June 22, 1915.
3 SHEETS—SHEET 3.
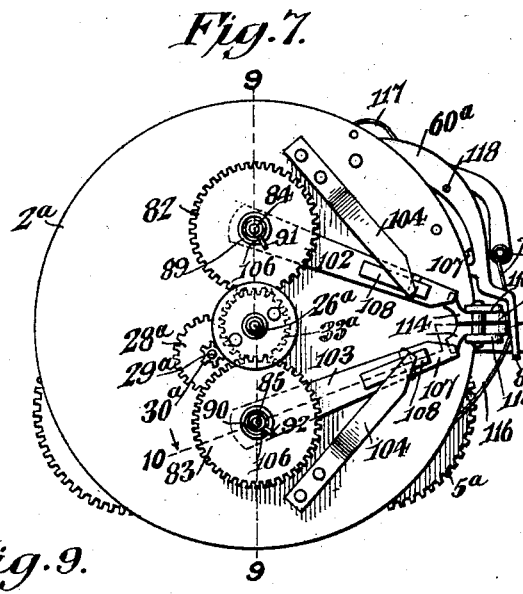
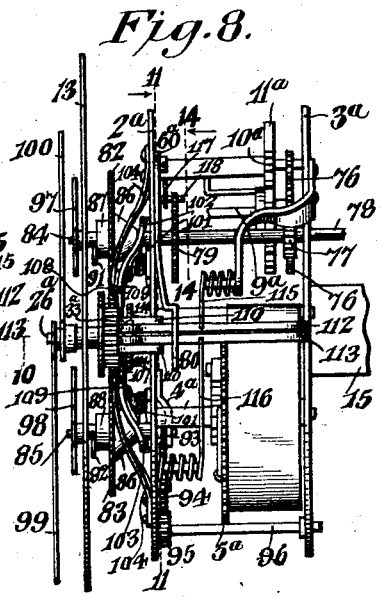
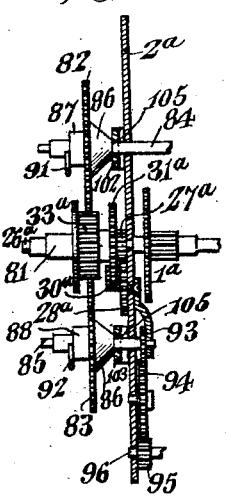
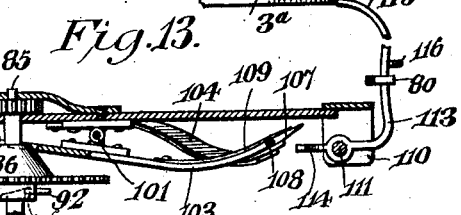
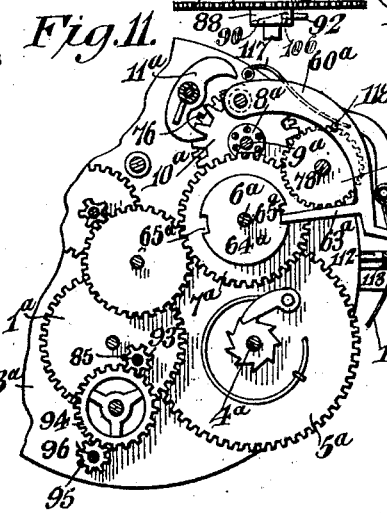
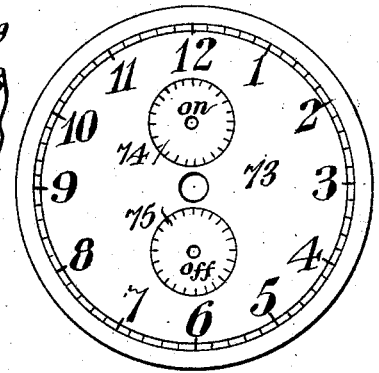
WITNESSES
Jas. K. McCathran
F. J. Chapman
A. W. Voedisch, INVENTOR
BY E. G. Siggers

UNITED STATES PATENT OFFICE.

ALFRED W. VOEDISCH, OF ABERDEEN, SOUTH DAKOTA.

ELECTRIC TIME-SWITCH.

1,143,869.  Specification of Letters Patent.  Patented June 22, 1915.

Application filed June 1, 1914. Serial No. 842,173.

*To all whom it may concern:*

Be it known that I, ALFRED W. VOEDISCH, a citizen of the United States, residing at Aberdeen, in the county of Brown and State of South Dakota, have invented a new and useful Electric Time-Switch, of which the following is a specification.

This invention has reference to improvements in electric time switches, and its object is to provide a switch particularly useful for cutting in and out electric lights or other electric devices at suitably timed intervals, with the employment of a minimum amount of mechanism for the purpose.

In accordance with the present invention there is provided a clock movement having a time side and another part which may correspond to a striking movement, and the latter movement is utilized for the operation of an electric switch which at one point in its travel effects the closure of a circuit, while at another point the circuit is open. In conjunction with the time movement there is provided a dial which participates in the operation of the time movement, and this dial is provided with a suitable series of numbers, preferably from one to twenty-four to correspond to the hours of an ordinary day. The dial is provided with fingers each movable to different points about the dial without interference with the other, but so connected to the dial as to be friction tight against movement on the dial by any of the operating mechanism of the device. In conjunction with the dial fingers there is provided a mechanism constituting a stop and release mechanism for the switch, and this mechanism is so arranged as to temporarily stop the switch mechanism from operation while the dial-actuated parts have moved to a position which would otherwise release the switch operating mechanism and permit it to move without impediment until such time as the dial carried devices shall have moved to the release position, which movement may take several minutes.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a front elevation of a structure embodying the present invention. Fig. 2 is a rear elevation thereof. Fig. 3 is a section immediately to the rear of the front plate of the clock movement. Fig. 4 is an end elevation as viewed from the right hand side of Fig. 1, distant parts being omitted to avoid confusion of illustration. Fig. 5 is a fragmentary top view showing a small portion of the working parts and omitting distant parts. Fig. 6 is a perspective view of a portion of the dial and parts carried thereby and a portion of the stop and release mechanisms. Fig. 7 is a view similar to Fig. 1 but showing another embodiment of the invention. Fig. 8 is an edge or side view of the structure of Fig. 7. Fig. 9 is a section on the line 9—9 of Fig. 7. Fig. 10 is a detail section on the line 10—10 of Fig. 7. Fig. 11 is a section on the line 11—11 of Fig. 8. Fig. 12 is a face view of a dial which may be employed in the structure of Fig. 7. Fig. 13 is a section similar to Fig. 10 but showing a different phase of the operation. Fig. 14 is a section on the line 14—14 of Fig. 8.

Referring to the drawings, there is shown a time movement 1 which may be of the familiar eight day type and requires no detailed description. The time movement is shown as mounted between two face plates 2, 3, respectively, but all such parts are to be taken merely as indicative of any suitable means for the purpose. There is also mounted between the two face plates another movement similar to the customary striking movement, and this consists of a power spring arbor 4 with a main gear 5 thereon driving another arbor 6 carrying a gear wheel 7 meshing with a pinion 8 on an arbor 9 in turn carrying an escapement wheel 10 controlled by an anchor escapement 11 on an arbor 12. The movement, which for convenience may be described as the striking movement, has been thus described in some detail to facilitate the following description, by locating some of the working parts. It will be understood, however, that both the time movement and the striking movement may be greatly varied over the showing of the drawings, the time movement simply representing a regularly moving power means best attained by a suitable clock movement of whatever character, and the striking movement simply representing any power means of available construction which may be controlled to operate at set times.

The two face plates 2 and 3 are shown as supported on respective brackets 13, 14, which may be taken as indicative of any means for sustaining the structure. Fast to one of the face plates, say, the face plate 3, is another bracket 15 offstanding from the plate and carrying at the end remote from the plate a block 16 shown as of insulating material, and in order to adjust the block to the bracket the latter has a longitudinal slot 17 where engaging the block, and said block is held to the bracket by a screw 18 extending through the slot. On opposite ends of the block 16 strips 19, 20, respectively, are secured, and these strips are continued toward the other end of the bracket 15, and each terminate in contact fingers 21 which may be opposed one to the other and approximately in contact after the manner of the corresponding terminals of a jack knife switch. The two strips 19 and 20 are supplied with respective binding posts 22 by means of which the device may be introduced into the circuit to be controlled, the binding posts receiving the terminals of appropriate conductors.

The arbor 6 is prolonged beyond the plate 3 and there carries a switch block 23 shown in the drawings as a cylindrical block, but such form is not at all obligatory. Fast to the block 23 which is of insulating material are switch plates 24 connected together by a conducting band 25 by means of which the blades 24 are made fast to the switch block, and are also electrically connected. The spacing of the switch blades 24 corresponds to the spacing of the spring contacts 21, and the blades 24 with their connecting band 25 constitute a bridging member for the fingers 21, which when the device is connected in the circuit constitute the terminals of the circuit, to be opened and closed by the fingers 24 of the switch block 23. Said block and the fingers may therefore be termed the rotary member of the switch, of which the members 21 constitute the fixed members, and these members are elastic so that good contact is always established.

The time movement is shown as provided with the usual minute hand arbor 26, which, as is customary, projects through the front plate 2, but in the present instance the minute hand arbor is not shown as provided with a hand, but carries one member 27 of the hour hand train, another member 28 of which is carried by a stud 29 on the face plate. The member 28 is provided with the usual small pinion 30 meshing with a gear 31 mounted on but movable independently of the arbor 26, and the latter is provided with a milled head 32, whereby it may be turned from time to time as an operator may desire. The gear wheel 31 carries a smaller gear 33 in mesh with a dial plate 34 mounted on an arbor 35 carried by the face plate 2. The arrangement is such that by manipulating the milled head 32 to turn the arbor 26 a slow rotary movement is imparted to the dial plate 34, and this latter, although shown relatively small in the drawings, may be as large as desired, and may be otherwise located than as shown in the drawings for convenience of observation. The dial plate is provided with a marginal series of numbers 36 which in the present instance are shown as covering a full twenty-four hour dial, so that one turn of the dial plate represents a full day. To facilitate reading of the dial an indicating pointer 37 is mounted on the face plate 2.

Mounted on the arbor 35 are two disks 38, 39, respectively, held in frictional engagement one with the other and with the disk by washers 40, 41, and the usual retaining pin 42, this means of holding the disks 38 and 39 in frictional engagement one with the other being indicative of any suitable means for the purpose. The disk 38 is provided with a radial finger 43, and the disk 39 is provided with a similar radial finger 44. The finger 43 has its outer end beveled as shown at 45, and this finger is also provided with a manipulating member 46 which may be in the form of a pin or handle of any kind. The finger 44 has an outer beveled end 47, and a manipulating member 48. The two disks 38 and 39 with the parts carried thereby may be alike with one separated from the plate 34 by the thickness of the other. The two disks are independently movable on the arbor 35, so that the fingers 43 and 44 may be moved to different relative positions with respect one to the other and to the series of numerals 36 on the dial plate, but the frictional engagement of the disks one with the other and with the dial plate is such that when the dial plate is rotated the disks move with it and are resistant to a sufficient extent to forces tending to independently move the disks that the fingers may be utilized to operate mechanisms to be described without liability of disturbance of the relation of the disks one to the other and to the dial plate.

The fingers 43 and 44 may be located at suitable points about the dial plate by means of the manipulating members 46 and 48, and when so positioned the dial plate, which is caused to rotate at proper speed by the time movement, carries these fingers around with it.

Mounted on a stud 49 on the plate 2 is a rock lever 50 having two arms 51 and 52. The arm 51 is broadened in the direction of the axis of the rocking of the lever and terminates in a beveled end 53 in the path of the outer ends of the fingers 43 and 44 and is wide enough to be engaged by each finger, the arrangement being such that as the fingers travel with the dial plate the finger which is the forward one, and in the particular instance this is the finger 43, will engage and rock the lever and ultimately escape therefrom, and then after a time interval the second finger, namely, the finger 44, will engage the arm 51 and again rock the lever and finally escape therefrom. The other end 52 of the lever is broadened in a direction substantially at right angles to the arm 51 and may, if desired, have a slight inclination to the plane of travel of the arm. In the path of the arm 52 is a beveled or conical head 54 on one end of a pin 55 extending through the face plate 2 and having at the end remote from the head 54 a bearing in a bracket 56. Between the face plate 2 and the head 54 the pin 55 is surrounded by a spring 57 tending to hold the head 54 away from the plate 2, but yielding to sufficient forces exerted upon the lever 50 to move the arm 52 against the conical head 54, thus forcing the head toward the plate 2. Between the inner face of the plate 2 and the outer end of the bracket 56 the pin 55 carries a block 58 provided with a conical or taper portion 59. The block 58 serves as a stop preventing projection of the pin 55 beyond a determined distance under the action of the spring 57.

Pivoted at one end to the plate 2 is a stop arm 60 shown best in Fig. 6, this arm having at one end an eye 61 for the passage of a pivot screw or bolt 62, but it will be understood that the manner of mounting the arm is not material to the present invention. About midway of the arm 60 it is provided with an extended finger 63 in normal engagement with a disk or wheel 64 on the arbor 6, and this disk 64 has notches 65 at diametrically opposite points. The arm 60 has a rocking movement determined by the depth of the notches 65, the finger 63 riding on the periphery of the disk 64 when not in a notch 65 and moving into these notches when either is brought into coincidence with the finger 63. The arm 60 is urged toward the disk 64 by a suitable spring 66, so that it always has a tendency to drop into one or the other of the notches 65. Formed on the arm 60 on the side of the finger 63 remote from the eye 61 is another finger 67 having its free end in the path of the conical part 59 of the block 58, and this finger either rests against the thin end of the block or the thick end thereof, in accordance with the movement of the pin 55 by which the taper or conical portion 59 of the block 58 is caused to engage the finger 57, and thereby rock the arm 60 in a direction against the action of the spring 66, such spring returning the arm to its first position on the movement of the block 58 toward and into engagement with the plate 2. The arm 60 is provided with still another finger 68 prolonged beyond the finger 67 and terminating in an angle extension 69. This angle extension 69 is movable into and out of the path of a pin 70 carried by the escapement arbor 12, the pin being, if necessary, bent into appropriate shape, and is formed with a notch 71 into which the angle extremity 69 may lodge.

The free end of the bracket 56 where traversed by the pin 55 is in close relation to the escapement wheel 10, but is spaced a short distance therefrom, while the pin 55 is so located that it may be moved toward and from the escapement wheel 10 and into the path of a pin 72 carried by the wheel or by the arbor upon which it is mounted. When the pin 55 is in its normal position with the block 58 against the plate 2, the extremity of the pin which extends through the free end of the bracket 56 is out of the path of the pin 72, but when the pin 55 is moved by the lever 50 against the action of the spring 57, its extremity approaching the escapement wheel 10 is moved into the path of the pin 72.

Let it be assumed that circuit terminals are made fast to the binding posts 22 and the circuit to be controlled contains electric lamps which it is desired should be turned on at a certain hour, and should be turned off at some other hour. The finger 43 is moved on the dial plate until it points to the desired time, say 7:30 o'clock, and let it be further assumed that it is desired to switch off the lights at about eleven o'clock. If the time side of the device be such that the day begins at noon, then if the lights are for night use, the finger 43 is moved on the dial until it is in a position between the numbers seven and eight on the dial, while the other finger 44 is moved to a point, say, between the numbers eleven and twelve on the dial. Of course, these numbers are taken arbitrarily merely for illustration, since the time device may be set for any time desired, and the fingers 43 and 44 will be correspondingly arranged.

Under ordinary conditions the switch members 24 are so related to the switch members 21 that the circuit is normally broken, and in the arrangement of the drawings a half turn of the switch block 23 is needed to establish the circuit. As soon as the time movement causes the dial plate or disk to move to an extent to bring the finger 43 into engagement with the arm 51 of the switch 50, the arm 52 is moved toward the head 54, and a further movement of the dial plate under the action of the time movement of the device causes the pin 55 to be moved longitudinally in its bearings by the reaction of the arm 52 on the conical head 54, thus compressing the spring 57. This movement of the pin 55 brings the conical or taper portion 59 of the block 58 into engagement with the finger 67, whereupon the arm 60 is rocked against the action of the spring 66 in a direction to carry the finger 63 out of the notch 65 in which it is assumed to be engaged, and also to carry the terminal 69 of the finger 68 out of the notch 71 of the pin 70. The movement of the arm 60 releases the striker movement both at the escapement 11 and the arbor 6, whereupon the striker mechanism immediately begins to move, but before it has moved any considerable distance the pin 72 reaches the pin 55 then in its path, and further movement is arrested. The time movement continues its action until finally the finger 43 passes the end 53 of the arm 51, and the reaction of the spring 57 by projecting the conical head 54 causes a return movement of the lever 50 and at the same time a return movement of the taper portion 57 of the block 58, thus permitting the arm 60 to move under the action of the spring 66 toward the disk 64 were it not for the fact that the slight movement of the striker mechanism permitted before being arrested by the engagement of the pin 72 with the pin 55 has moved the notch 65 away from the finger 63, so that the latter now rests upon the periphery of the disk 64. This holds the detent end or terminal 69 of the finger 68 out of the path of the pin 70, so that the pin 72 now being released from the pin 55 no longer holds the striker mechanism from movement under its normal tendency, and this movement becomes active to rotate the switch block 23 until the switch members 24 are in engagement with the respective switch members 21, but the parts are so timed in action that at this point the next notch 65 in order has come into coincidence with the finger 63, and the latter thereupon moves into the notch permitting the arm 60 to rock under the action of the spring 66 to bring the detent or stop finger 69 into the path of the pin 70. This finger lodges in the notch 71, thus holding the striker movement against further action, and the switch is stopped in the closed position and there held, until the finger 44 engages the arm 51 of the lever 50 and causes the opening movement of the switch in like manner to the closing movement caused by the finger 43.

Both movements of the switch are caused by a single time movement and by a single actuating mechanism for the switch controlled by the time movement through the time setting devices, and these in turn control a primary stop and release means, which when actuated permits a limited active movement of the switch actuating mechanism sufficient to fully release the latter so far as the primary stop and release means is concerned, but then bringing into active position a secondary stop and release means restraining the switch actuating mechanism until the primary stop and release means has escaped from the control of the time movement.

In the structure shown in Fig. 1 and associated figures a single dial plate is employed, while in Fig. 7 and associated figures separate dials are utilized.

In the structure of Fig. 1 a time dial 73, such as shown in Fig. 12 may be employed, and while the dial 73 is designed more particularly for use in conjunction with the form of the invention embodied in Fig. 7 and associated figures where two setting dials 74, 75 are employed, a single dial similar to either dial 74 or 75 may be provided.

In Fig. 7 and associated figures there are face plates $2^a$ and $3^a$ with a time movement $1^a$ housed between them, and a striker movement also housed between them, this striker movement being made up of a spring arbor $4^a$ with a main gear $5^a$ driving another arbor $6^a$ carrying a gear wheel $7^a$ meshing with a pinion $8^a$ on an arbor $9^a$ in turn carrying an escapement wheel $10^a$ controlled by an anchor escapement $11^a$. On the arbor $9^a$ is mounted a gear wheel 76 meshing with a pinion 77 on another arbor 78 in turn carrying a gear wheel 79 to which reference will hereinafter be made. On the arbor $6^a$ there is mounted a notch wheel $64^a$ similar to the notch wheel 64 of the structure of Fig. 1 and associated figures, the notch wheel $64^a$ having diametrically opposite notches $65^a$ in its periphery.

Pivoted at one end to the face plate $2^a$ is a rock arm $60^a$ provided with a finger $63^a$ adapted to enter either of the notches $65^a$ and also having a continuation in the form of a finger 80 to which reference will hereinafter be made.

The structure of Fig. 7 and associated figures is provided with a minute hand arbor $26^a$ similar to the arbor 26, and this arbor carries a gear wheel $27^a$ driving the hour hand train made up of a gear wheel $28^a$ mounted on a stud $29^a$ and carrying a pinion $30^a$ in turn driving a gear wheel $31^a$ to which is secured another pinion $33^a$ on the usual hour hand sleeve shown at 81. The gear wheel $33^a$ is in mesh with oppositely disposed gear wheels 82 and 83, respectively, mounted on arbors 84 and 85 individual thereto. The gear wheels 82 and 83 are each provided with a hub portion 86 toward the face plate $2^a$ and a collar 87, 88, respectively, on the face of the gear wheel remote from the hub. The outer end of each collar 87 is formed into a cam 89, 90, respectively. The arbor 84 carries a radial pin 91 in position to engage the cam 89 and the arbor 85 carries a similar pin 92 in position to engage the cam 90. The arbor 84 is continued through both face plates, and has an extension by means of which it may be turned for setting. Because of the presence of mechanism which would be in the way of an extension of the arbor 85 in the particular showing of the drawings, the arbor is provided with a gear 93 in mesh with an idler gear 94 in turn meshing with a pinion 95 on an arbor 96 continued through the face plate 2 for the ready setting of the arbor 85. The arbors 84 and 85 have respective hands 97 and 98 movable in front of the sub-dials 74 and 75, while the time arbor 26ᵃ and sleeve 81 carry respective minute and hour hands 99 and 100 movable in front of the dial 73, as is customary.

The two gear wheels 82 and 83 not only rotate but are capable of moving lengthwise on their respective arbors. Mounted on the face plate 2ᵃ by hinge or pivot connections 101 are two levers 102 and 103, respectively, each having one end urged toward the face plate 2 by a respective spring 104. The other ends of the levers are each provided with a passage 105 through which the respective arbor 84 or 85 extends. The spring 104 of each lever normally constrains the gear wheels 82 and 83 toward their outermost position, that is, at the farthest point away from the face plate 2ᵃ, but when the gear wheels are turned the cam edges of the collars 87 and 88 acting against the pins 91 and 92 cause the gear wheels to approach the face plate 2ᵃ to an extent dependent upon the height of the respective cam, and under these circumstances the levers 102 and 103 are rocked on their pivots or hinges in a direction against the action of the springs 104, this bringing the ends remote from the respective gear wheels away from the plate 2ᵃ. As the gear wheels rotate the cam surfaces each of which terminates in an abrupt shoulder, indicated at 106, are moved under the pins 91 and 92 until these pins reach the shoulders 106, whereupon the reaction of the springs 104 which have been progressively compressed cause a rocking of the levers to force the gear wheels away from the face plate and the other ends of the lever toward the face plate 2ᵃ, this movement being rapid.

Each lever 102 and 103 has a pivoted nose extension 107 at the end remote from the respective gear wheel 82 or 83. The nose 107 is provided with a stop 108 preventing its movement beyond a certain distance in one direction and with a spring 109 yieldable to movement of the nose in the other direction, but normally holding it against the stop 108.

On the face plate 2ᵃ are spaced ears 110 traversed by a pivot pin 111 upon which are mounted two arms 112 and 113 side by side. Each arm has a finger extension 114 in the path of the nose 107, while each arm extends from its pivot support 111 across the space between the two plates 2ᵃ and 3ᵃ and abuts at the other end normally against the edge of the plate 3ᵃ. The arms are held in such position by respective springs 115 and 116 carried by the respective plates 3ᵃ and 2ᵃ, but these springs may be otherwise disposed. The arms 112 and 113 are so located as to be closely overridden by the finger 80 which, when the finger 63ᵃ is in a notch 65ᵃ, may engage the arms 112 and 113. The rock arm 60ᵃ is constrained toward the notch wheel 64ᵃ by a spring 117 engaging at its free end a pin 118 on the arm 60ᵃ, which pin when the finger 63ᵃ of the arm 60ᵃ is seated in a notch 65ᵃ engages between two teeth of the gear wheel 79, as best shown in Fig. 14, the striker movement being thus locked against action under the influence of its driving spring.

The arbor 6ᵃ in the structure of Fig. 7 and associated figures is assumed to carry a switch block 25, and the face plate 3ᵃ is assumed to carry a bracket 15 carrying switch members 21 and all the electric side of the structure is assumed to be the same in Fig. 7 and associated figures as in Fig. 1 and associated figures, but for simplicity of illustration these parts have been omitted from the showing of Fig. 7 and associated figures, having been shown in the earlier figures of the drawing, and repetition of this part of the showing being deemed to be unnecessary, since the invention may be fully understood without such additional showing.

In the operation of the structure of Fig. 7 and associated figures both pins 91 and 92 are properly set in accordance with the indications on the dials 74 and 75. Now when a time movement causes a movement of the gear wheels 82 and 83 to the point indicated by the dials 74 and 75, it being assumed that the proper point on the dial 74 is reached before that of the dial 75, the pin 91 rides off from the shoulder 106 on the sleeve 87, thus causing the nose 107 of the lever 102 to be brought into engagement with the finger 114 of the arm 112, thus rocking the latter in a direction to lift the finger 80, thereby rocking the arm 60ᵃ in a direction to lift the pin 118 from engagement with the gear wheel 79, and the finger 63ᵃ out of the corresponding notch 65ᵃ. The nose 107 immediately snaps beyond the engaged finger 114, thus releasing the arm 112, but in the meantime the striking movement has started and has moved sufficiently to carry the notch 65ᵃ out of the path of the finger 63ᵃ, thus preventing the arm 60ᵃ from returning to its first position, whereupon the striking movement continues to move and the switch is rotated from the position it first had, which may be considered as the open position, toward the closed position, and this movement continues until the switch is fully closed, at which point the second notch 65ª is brought into coincidence with the finger 63ª and the arm 60ª moves until the finger 63ª reaches the bottom of the notch 65ª. At the same time the pin 118 drops between two teeth of the gear wheel 79 and the striking movement is locked, thus locking the switch in the closed position. The switch remains closed until the pin 92 drops off of the shoulder 106 of the cam collar 88, whereupon the other arm 113 is actuated to release the striker movement to cause the opening of the switch and the subsequent locking thereof in the open position. The switch will be closed and opened each day, the parts being timed so as to cause a rotation of each gear wheel 82 and 83 once in twenty-four hours. As the gear wheels 82 and 83 are rotated to bring the cam surfaces into engagement with the pins 91 and 92 the levers 102 and 103 are rocked to carry the noses 107 away from the plate 2ª, but in this movement they snap idly by the fingers 114 into position to actively engage these fingers in a reverse movement of the levers 102 and 103.

The operation of the structure of Fig. 7 and associated figures is similar to that of the structure of Fig. 1 and associated figures, except that in Fig. 7 there are two separate and distinct setting and releasing mechanisms as distinguished from a single setting and release mechanism of Fig. 1.

What is claimed is:—

1. In an electric time switch, a time movement, an electric switch, actuating mechanism for the electric switch, adjustable rotative means movable by the time movement, means movable in a direction parallel with the axis of rotation of the rotative means and controlled by said rotative means, a lever movable by the last-named means, and means controlled by the lever for releasing and stopping the actuating mechanism for the electric switch.

2. In an electric time switch, a time movement, an electric switch, power means for driving the switch, stop means for the switch actuating means, adjustable rotatable setting means mounted on the time movement for actuation thereby, and connections between the setting means and stop means for moving the latter to release the switch actuating means, said connections including means movable in a direction parallel with the axis of rotation of said setting means and also including direction-changing means between the last-named means and the stop means.

3. In an electric time switch, a time movement, an electric switch, actuating mechanism for the electric switch, rotatable setting means carried and actuated by the time movement, a rock lever in the path of the setting means for actuation thereby, a slidable pin mounted for movement in a direction parallel with the axis of rocking of the rock lever and at one end provided with a bevel head in the path of the lever, and stop and release mechanism for the switch actuated mechanism in the path of and controlled by the slidable pin.

4. In an electric time switch, a time movement, an electric switch, actuating mechanism for the latter including a notch wheel having notches disposed in accordance with the open and closed positions of the switch, pins participating in the movement of the switch-actuating mechanism, a rock arm provided with a finger related to the notch wheel to move into and out of the notches, another finger movable into and out of the path of one of the pins on the actuating mechanism and also provided with a third finger, a slidable pin having one end movable into and out of the path of the other pin on the actuating mechanism and provided with a bevel portion in operative relation to the third finger on the rock arm, said slidable pin having a normal constraint toward the inactive position and provided at one end with a taper head, a lever having an arm in operative relation to the taper head and also provided with another arm, and setting means carried by the time movement for engaging the second-named arm of the lever.

5. In an electric time switch, a time movement, a striker movement associated therewith, setting means on and actuated by the time movement, a lever having an arm in the path of the setting means for actuation thereby, and also having another arm, a spring actuated slidable pin having a taper head in the path of the second-named arm of the lever and also provided with a taper block movable with the pin, a pin on the striker movement into and out of the path of which the first-named pin is movable, a rock arm associated with the striker movement and provided with fingers, a pin on the striker movement into and out of the path of which one of the fingers is movable, with another one of the fingers of the arm in the path of the taper block of the first-named pin, a notch disk on the striker movement with which a third one of the fingers on the arm is associated for movement into and out of the notches, and an electric switch carried by the striker movement and movable from closed to open position, and from open to closed position in accordance with the spacing of the notches of the notch wheel.

6. In an electric time switch, a time movement, an electric switch, another movement for actuating the electric switch, setting mechanism on and controlled by the time movement, a slidable pin provided with a spring urging it in one direction and also provided with beveled portions, a lever controlled by the setting means and in operative relation to one beveled portion of a pin for causing a sliding movement of the pin in opposition to the spring, another lever having portions in the path of corresponding parts of the switch-actuating movement to serve as stops therefor and also provided with a portion under the control of another beveled part of the pin for actuation thereby, and a stop member on the actuating mechanism for the switch into the path of which the pin is movable when actuated in opposition to its spring.

7. In an electric time switch, a time movement, an electric switch, actuating mechanism for the electric switch having a constant tendency to actuate the switch, setting mechanism on and controlled by the time movement, a slidable pin, means under the control of setting mechanism for actuating the slidable pin, and coacting stop members one on the switch actuating mechanism and the other under the control of the slidable pin, said stop members being timed in movement to temporarily hold the switch actuating mechanism while the pin is being actively moved by the setting mechanism and to release the switch actuating mechanism to a predetermined active movement on the release of the pin from the control of the setting mechanism.

In testimony, that I claim the foregoing as my own, I have hereto affixed my signature in the presence of two witnesses.

ALFRED W. VOEDISCH.

Witnesses:
GEO. BOLLES,
GUST ANDERSON.